Aug. 2, 1960 M. DAVIS 2,947,162
INSTRUMENT FOR CALIBRATING MANOMETERS
Filed March 16, 1959
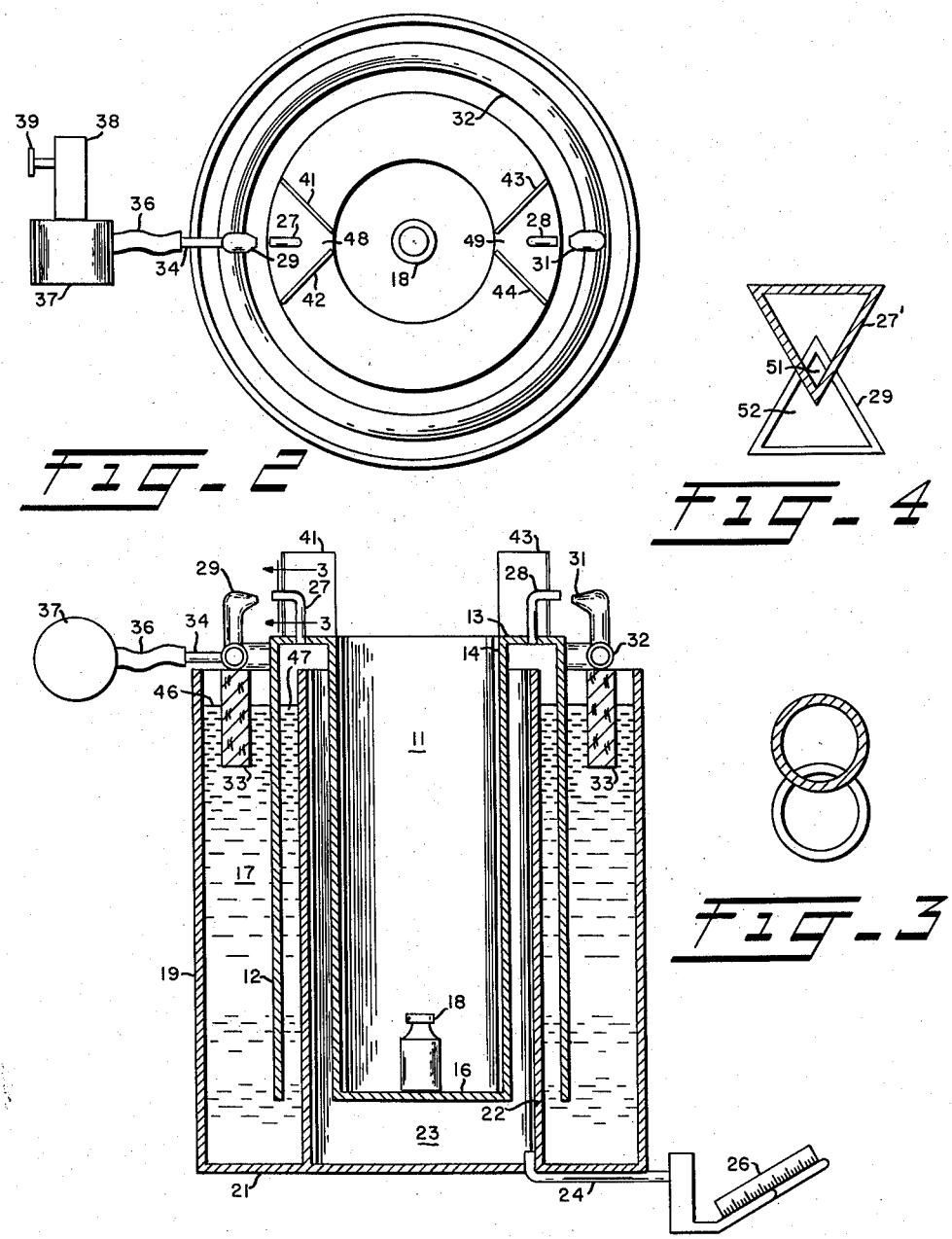
INVENTOR.
MANFRED DAVIS
BY
ATTORNEY.

United States Patent Office

2,947,162
Patented Aug. 2, 1960

2,947,162

INSTRUMENT FOR CALIBRATING MANOMETERS

Manfred Davis, Bronxville, N.Y., assignor to General Precision Inc., a corporation of Delaware Filed Mar. 16, 1959, Ser. No. 799,640

6 Claims. (Cl. 73—4)

This invention relates to instruments for measuring gas pressures and more particularly to instruments for calibrating manometers.

The invention provides a device for calibrating the relative indications of a manometer by the use of a set of weights, and therefore constitutes a primary calibration device. It is particularly applicable to gas manometers having a range between zero and eight inches of vertical water column.

The device of this invention comprises an open cylinder inverted and floating in a liquid so as to trap air in its closed end. A pipe leads from this air space to the manometer which is to be calibrated. The weight of the cylinder is adjustable and constitutes the standard of measurement. Means are provided for forcing air under pressure into the closed air space of the cylinder. Then, when the depth of immersion of the floating cylinder is at a selected point as maintained by a feedback device, there is a direct and linear relation between the weight of the cylinder and the air pressure applied to the manometer.

The purpose of this invention is to provide an instrument for the absolute calibration of manometers.

A further understanding of this invention may be secured from the detailed description and drawings, in which:

Figure 1 is a cross-sectional side view of an embodiment of the invention.

Figure 2 is a top view of the embodiment of Figure 1.

Figure 3 is a cross section of a pair of circular air jet nozzles taken on the line 3—3, Figure 1.

Figure 4 is a cross section of a pair of triangular air jet nozzles taken on the line 3—3, Figure 1.

Referring now to Figs. 1 and 2, a double walled cylinder 11 consists essentially of an outer wall 12 and a closed end 13 having a deep depression or well therein forming the inner wall 14, with a well bottom 16. The cylinder is floated, open end down, in a liquid, such as water 17. The function of the center well is to provide a place for weighting the cylinder with calibrated weights such as the weight 18 and, by positioning the weight well below the center of buoyancy, to cause the cylinder to float stably.

The water is contained in a receptable having an outer wall 19 and a bottom 21. To reduce the amount of water required, the outer wall 19 of the receptacle is made but little larger in diameter than the outer wall 12 of the cylinder. For the same reason the receptacle is provided with an inner wall 22 interleaved, or telescopically positioned, between the inner and outer cylinder walls.

The water level in the receptacle is maintained below the top of the inner wall 22 and does not enter the space 23 inside the inner wall, which is air filled. A pipe 24 leads from this air space to the manometer 26 which is to be calibrated.

Air pressure is introduced into the air space in the top of the cylinder 11 by means of two opposed pipes, 27 and 28, passing through the closed end 13 thereof. Each of these pipes, 27 and 28, is bent outwardly at its end so as to be directed horizontally and away from the axis of the cylinder. Opposed to the end of each pipe is a nozzle, 29 and 31. These nozzles 29 and 31 are tapped into a pipe 32 which forms a closed ring lying in a horizontal plane. The ring pipe 32 is supported on a ring 33 of buoyant material, such as cork, floating in the water 17. A tube 34 and rubber hose 36 interconnects the closed ring 32 and an air pump 37 rotated by a motor 38. The amount of air delivered by the pump is adjustable by means of the knob 39.

Two vanes, 41 and 42, are positioned at angles near the pipe 27 and two other vanes 43 and 44, are similarly positioned obliquely near and behind pipe 28.

The two pairs of opposed openings, namely, pipe 27 with nozzle 29 and pipe 28 with nozzle 31, constitute a sensitive automatic levelling device operating, at the several calibrated weight values which weight 18 may have, to bring the level of the water on the external surface of cylinder wall 12 to the same line on the wall. To accomplish this, the nozzle and pipe ends may be circular as shown in Fig. 3 or, preferably, triangular as shown in Fig. 4. The air blasts from nozzles 29 and 31 additionally, by their actions on vanes 41, 42, 43 and 44, hold the cylinder 11 midway between the nozzles 29 and 31 and also hold the axes of the pipes 27 and 28 in alignment in the horizontal plane with the axes of the nozzles 29 and 31. In the vertical plane through the nozzles 29 and 31 the ends of the pipes 27 and 28 are normally misaligned somewhat with the nozzles 29 and 31, as shown by Fig. 3.

Before operation of the instrument, with pump 37 turned off and a small weight 18 or no weight placed in the cylinder well, the water surface 46 outside the cylinder wall 12 is at the same level as the water surface 47 inside the wall 12. The air pressure in space 23 is atmospheric. Buoyancies and weights are so designed that the nozzles and pipes are opposed in the relative position shown in Figs. 3 and 4.

When pump 37 is turned on, air from nozzle 29 strikes the end of pipe 27 and air from nozzle 31 strikes the end of pipe 28, producing increased air pressure within the cylinder air space 23. The air blasts from nozzles 29 and 31 also blow against the vanes 41, 42, 43 and 44, passing out the openings 48 and 49 between the pairs of vanes, thus maintaining the separation between nozzle 29 and pipe 27 equal to the separation between nozzle 31 and pipe 28. This vane action also maintains axial alignment in the horizontal plane.

The increased air pressure within the air space 23 forces the water level 47 down and also, pressing upward on the inner surface of the cylinder top 13, aids the buoyancy of the cylinder and tends to raise it in the water, thus tending to lower the line at which the water surface 46 touches the outer surface of wall 12. However, this causes pipe end 27', Fig. 4, to rise relative to nozzle 29, reducing the lozenge-shaped area 51. This reduces the velocity of the air emitted from nozzle 29 both by increasing friction and because the ratio of the area 51 to area 52 is reduced, for area 51 is the area through which air leaving nozzle 29 meets resistance of compressed air within pipe 27, while air leaving area 52 discharges to the atmosphere. Thus, when the area 51 has been reduced sufficiently, equilibrium is attained and the resulting water level 46 on the external wall 12 is the equilibrium level.

Considering the device as a servomechanism, this action may be termed negative feedback for the reason that increased pressure in the cylinder causes a mechanical action affecting the nozzle which, operating as regulating valves, limit the increase of pressure in the cylinder.

Conversely, reduced pressure in the cylinder, again through mechanical coupling to the regulating valves, limits itself.

In the use of this instrument, it is zero calibrated with the weight 18 eliminated and with the pump 37 shut off. The cork float is designed so that, in this condition of operation, the relative positions of nozzle 29 and pipe 27 are as closely as possible the relative positions they assume with the pump turned on, with a weight 18 applied and the water level stabilized. Under this zero calibration condition the manometer 26 reading indicates the atmospheric pressure, $P_0$.

Let a weight 18 having the value W be added to cylinder 11. The pump 37 is started and its pressure adjusted. The air pressure thereby produced in the space 23 helps to support the cylinder and weight. The cylinder comes to rest at the nozzle datum postion, with air pressure registered by the manometer 26. This pressure is $$P_1 - P_0 = \frac{W}{A}$$

in which $P_1$ is the increased pressure over atmospheric pressure in the space 23. A is the sum of the area of the cylinder top 13 and of the bottom of the well 16 acted on by the air pressure. Since W and A can be measured with accuracy $(P_1+P_0)$, is as accurately determined except for the error due to movements of the nozzle. This, however, can be made negligible by making the wall 12 thin or by changing its shape. Alternatively, any other liquid than water may be employed.

What is claimed is:

1. An instrument for calibrating a manometer comprising, a double walled cylindrical container having inner and outer walls and an open top and closed bottom forming a central cylindrical chamber and an outer concentric chamber, a reentrant cylinder having a closed bottom central reentrant portion positioned internally of said cylindrical chamber and a dependent outer wall concentrically positioned between the inner and outer walls of said double walled cylindrical container, a liquid filling said outer concentric chamber to a selected level below the top of said double walls whereby an air chamber is formed which encompasses the space between the inner wall of said cylindrical container and the central reentrant portion of said reentrant cylinder, means connecting a manometer to said air chamber whereby the air pressure developed in the air chamber is applied to said manometer, a pipe member connected to the upper end of said reentrant cylinder communicating with said air chamber, said pipe member having one end disposed in a radial direction as respects said reentrant cylinder, an air pump, a conduit connected thereto having a nozzle positioned adjacent to but vertically offset in overlapping relation as respects said pipe end whereby relative vertical movement betwen said pipe end and said nozzle varies the air pressure in said air chamber, said nozzle being maintained at a fixed height as respects the liquid level in said outer concentric chamber, and means for varying the weight of said reentrant cylinder.

2. An instrument for calibrating a manometer comprising, a liquid container having an open top, a liquid therein, an air container having an open bottom and closed top floating in said liquid with its open bottom positioned below the surface of said liquid and having air entrapped in the upper part thereof forming an air chamber, means for varying the weight of said air container, an air pump, a conduit connecting a manometer to said air chamber whereby air pressure therein is applied to the manometer, a plurality of openings in the closed top of said air container, a pipe in each said opening extending out of said closed top, each said pipe having an open outer end extending horizontally and away from the vertical center line of said air container, a float in said liquid, a plurality of nozzles supported thereby, each said nozzle being close to and generally directed toward the open outer end of one of said pipes, and conduits connecting said air pump to supply air to said nozzles.

3. An instrument for calibrating a manometer comprising, a liquid container having an open top, a liquid therein, an air container having an open bottom and closed top floating in said liquid with its open bottom positioned below the surface of said liquid and having air entrapped in the upper part thereof forming an air chamber, means for varying the weight of said air container, an air pump, a conduit connecting a manometer to said air chamber whereby air pressure therein is applied to the manometer, a pair of pipe members connected to the upper end of said air container communicating with the air chamber thereof, said pipe members each including an end outside said air container, each pipe end pointing horizontally and radially relative to the vertical center line of said air container and at equal radial distances therefrom, said two pipe ends being pointed in opposite directions, a conduit connected to said air pump having two nozzles positioned respectively adjacent to but vertically offset from said pipe ends in overlapping relation, said two nozzles being positioned to point in opposite directions, means in said liquid supporting said two nozzles at a fixed level relative to the liquid level in said liquid container, whereby relative vertical movement between said pipe ends and said nozzles varies the air pressure in said air chamber.

4. An instrument in accordance with claim 3 in which said nozzles and said pipe ends are circular in cross section and in which the normal relative positions of a nozzle and its adjacent pipe end are non-coaxial, the axis of the pipe end being above the axis of the pipe end.

5. An instrument in accordance with claim 3 in which said nozzles and said pipe ends are triangular in cross section, each pipe end triangular orifice having an apex at its lowest point and each nozzle having an apex at its highest point, said lowest and highest adjacent apexes overlapping, the axis of each said pipe end being higher than the axis of its adjacent nozzle.

6. An instrument in accordance with claim 3 having two vanes mounted on said air container behind each said pipe member, said vanes being vertically positioned and in the horizontal plane comprehending the pipe end axis making equal acute angles with said axis, whereby air blown from said nozzles may strike said vanes and cause reactions positioning the pipe ends symmetrically to the nozzles in the horizontal plane.

References Cited in the file of this patent

FOREIGN PATENTS 542,722    Germany _____ Jan. 27, 1932